United States Patent [19]
Rockwood et al.

[11] Patent Number: 4,547,771
[45] Date of Patent: Oct. 15, 1985

[54] VIBRATION SENSOR

[75] Inventors: Robert E. Rockwood, Windham, N.H.; Victor Ximenes, Haverhill, Mass.

[73] Assignee: A. W. Chesterton Company, Stoneham, Mass.

[21] Appl. No.: 408,044

[22] Filed: Aug. 13, 1982

[51] Int. Cl.$^4$ .............................................. G08B 23/00
[52] U.S. Cl. ..................................... 340/683; 73/660; 340/691
[58] Field of Search .................. 340/683, 691; 73/593, 73/660

[56] References Cited

U.S. PATENT DOCUMENTS

| | | | |
|---|---|---|---|
| 3,783,680 | 1/1974 | Mason | 73/660 X |
| 3,913,084 | 10/1975 | Bollinger et al. | 340/683 |
| 3,927,571 | 12/1975 | Athey | 340/691 X |
| 4,295,136 | 10/1981 | Stoutenburg | 340/683 X |
| 4,317,105 | 2/1982 | Sinha et al. | 340/683 X |

Primary Examiner—James L. Rowland
Assistant Examiner—Brian R. Tamm

[57] ABSTRACT

In a vibration level indicator of the type having a vibration transducer and means for determining the average vibration level, the improvement having a storage element for holding a reference value corresponding to a selected level of the vibrations, and compare and display means responsive to the storage element and the transducer for indicating the relative relationship between the average level and the selected level.

7 Claims, 3 Drawing Figures

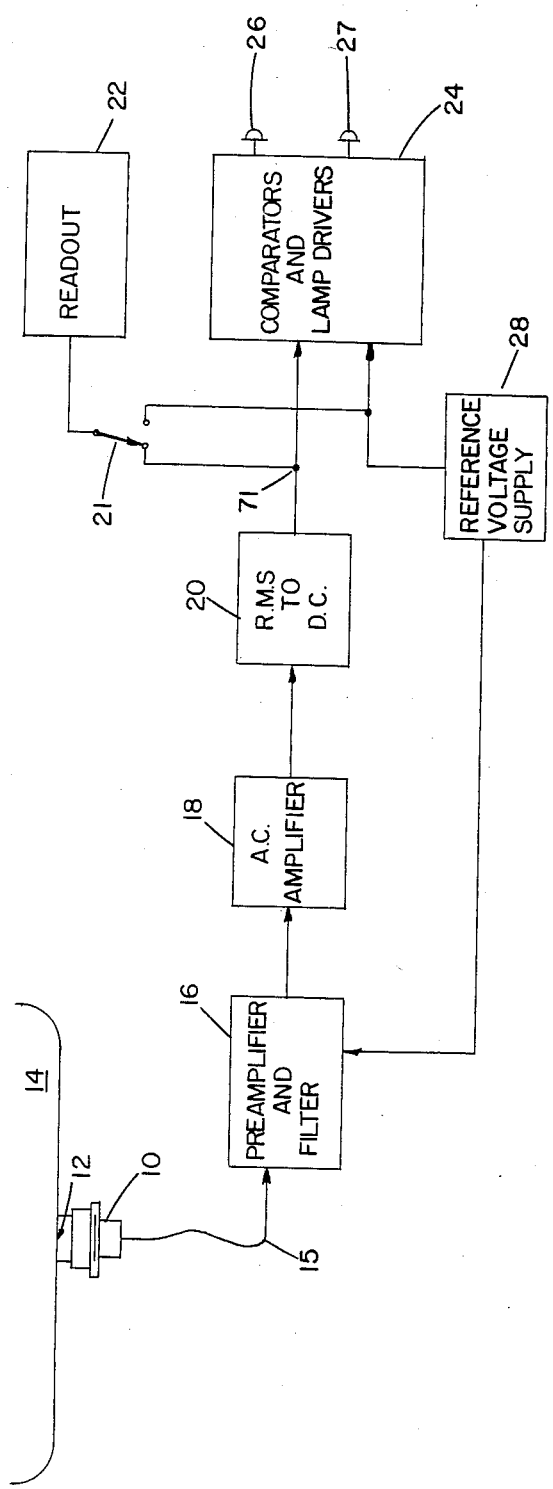
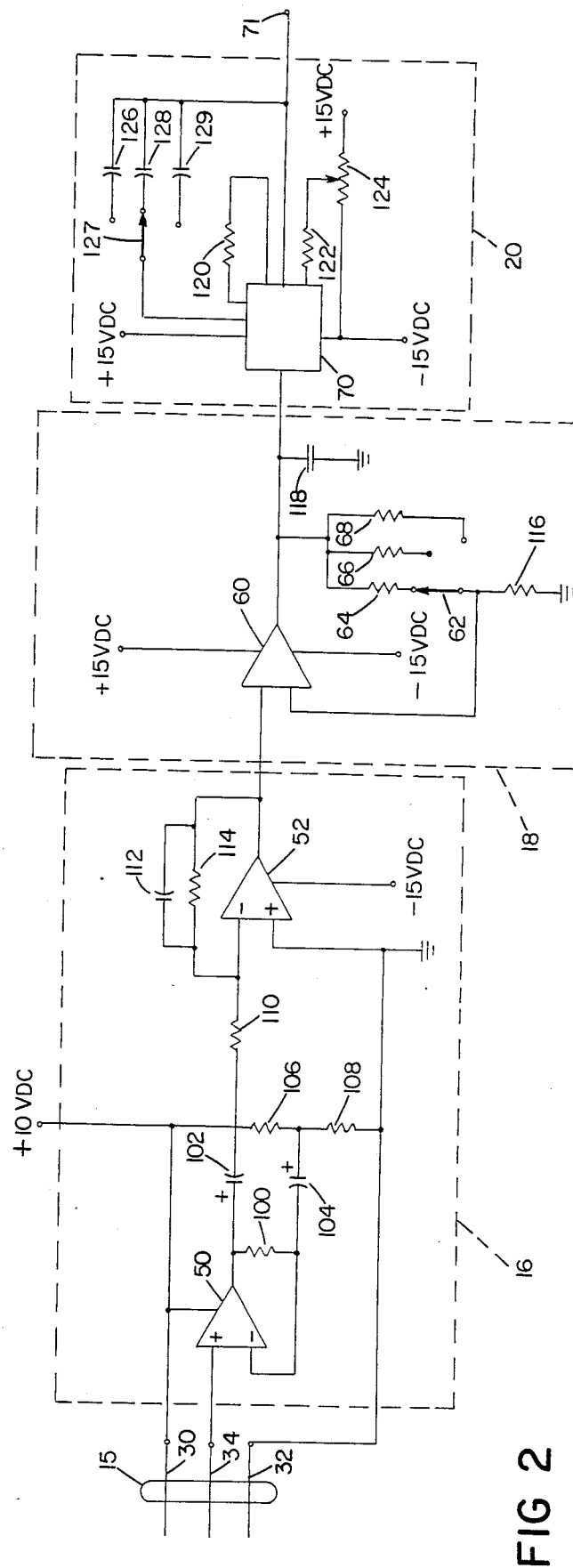
FIG 1
FIG 2

VIBRATION SENSOR

BACKGROUND OF THE INVENTION

This invention relates to apparatus for indicating the level of vibrations in a vibrating object (e.g., rotating machinery), of the type having a transducer for sensing the vibrations and means responsive to the transducer for determining the average level.

In rotating machinery (e.g. centrifugal pumps), the level of vibration and changes in that level may indicate whether or not the machinery is running properly and, if not, the nature of the problem. In typical vibration level indicators, a vibration transducer provides a signal which is processed and displayed on a meter.

SUMMARY OF THE INVENTION

In general, the invention features the improvement in which there is a storage for holding a reference value corresponding to a selected level of the vibrations, and compare and display means responsive to the storage element and the transducer for indicating the relationship between the average and selected levels of the vibrations.

In preferred embodiments, there is a control element for updating the reference value to correspond to the current average level of the vibrations; the compare and display circuitry has a comparator for providing a signal when the average level is greater than the selected level, and a visual indicator responsive to the comparator and arranged to be activated when the signal is provided; there is an additional comparator for providing a further signal when the average level is less than the selected level, and an additional visual indicator responsive to the additional comparator and arranged to be activated when the further signal is provided, whereby when fluctuations of the average level are centered on the selected level, the visual indicators are activated alternately at the frequency of said fluctuations; the storage element is a controllable voltage source, the reference value is a first voltage, the means for determining provides a second voltage corresponding to the average level, and the comparator compares the voltages; and the compare and display means has a readout element for displaying the average level and the selected level.

Rapid and accurate indication is given of any shift in the average vibration level from the selected value; the selected value can be easily updated the average vibration level can be quickly and accurately determined; the indicators are highly sensitive to shifts in average vibration level; and the frequency of alternation of the two indicator lamps indicates how closely the actual average vibration level is following the reference level.

Other advantages and features of the invention will be apparent from the following description of the preferred embodiment and from the claims.

DESCRIPTION OF THE PREFERRED EMBODIMENT

We first briefly describe the drawings.

Drawings

FIG. 1 is a block diagram of a vibration level indicator according to the preferred embodiment.

FIGS. 2 and 3 are circuit diagrams of portions of the indicator of FIG. 1.

Structure

Figure 3:
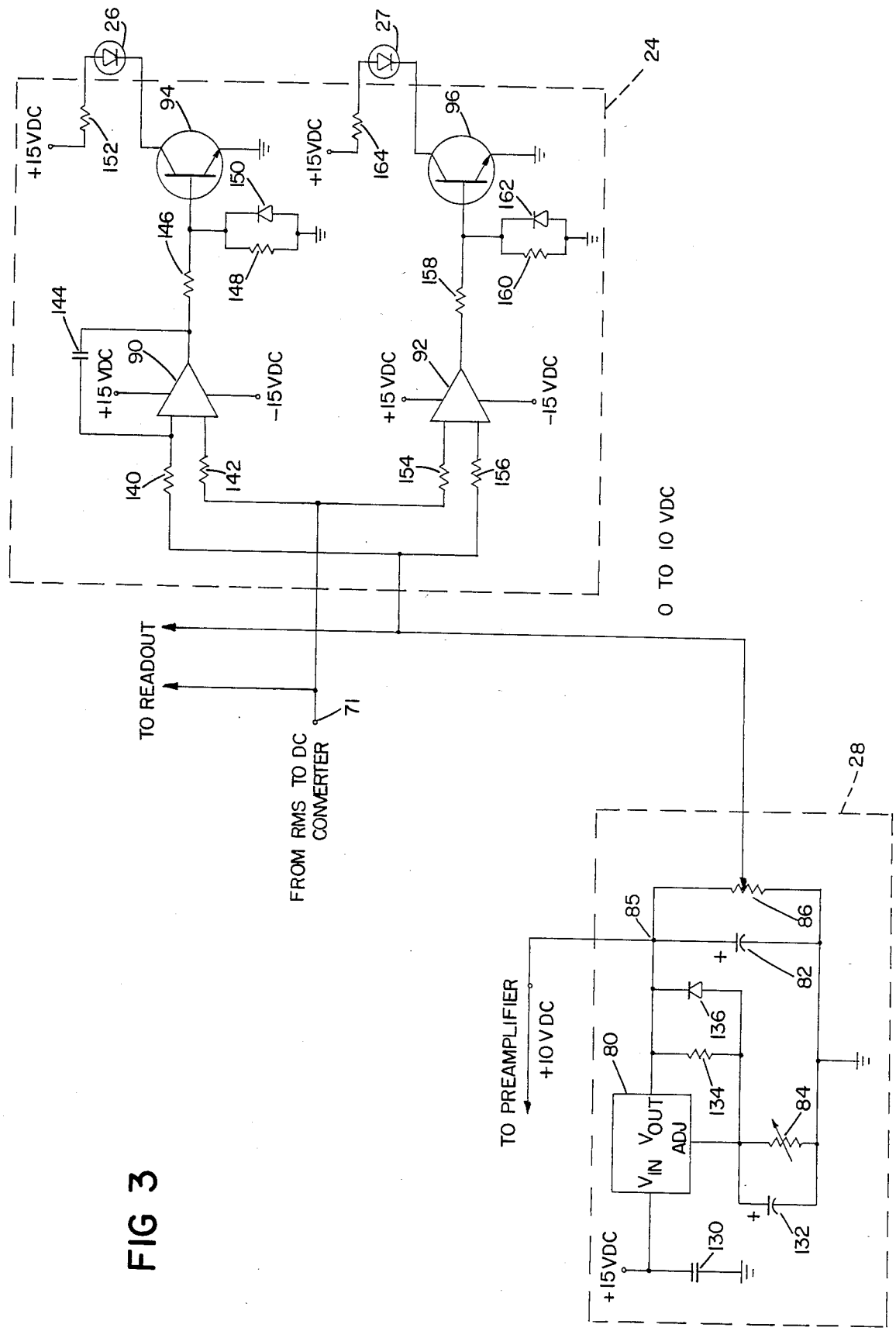

Referring to FIG. 1, transducer 10 has a vibration sensitive element 12 touching a vibrating object 14 (e.g., the impeller housing of a centrifugal pump) whose average vibration energy level fluctuates over time. The output of transducer 10 (an AC signal whose frequency and amplitude correspond to the frequency and amplitude of the vibrations) is fed via shielded two-conductor cable 15 to preamplifier and filter 16 having a pair of operational amplifiers for filtering and amplifying the signal, then through AC amplifier 18 for further amplifying the signal in accordance with a selectable gain level, and then through RMS-to-DC converter 20 for integrating (according to a selectable integration constant) to derive a DC signal corresponding to the RMS level of the AC signal. The resulting DC signal can be displayed (via switch 21) on digital readout device 22 (e.g., a conventional $3\frac{1}{2}$ digit LCD display) and forms one input to a pair of comparators and lamp drivers 24 for respectively driving a pair of indicator lamps 26, 27. A second input to the comparators and lamp drivers 24 is a controllable reference voltage (also displayable on readout device 22) provided from reference voltage supply 28, which also provides a constant excitation voltage to transducer 10 via preamplifier and filter 16.

Referring to FIG. 2, in cable 15 one lead 30 is connected to +10 volts DC (provided from reference voltage supply 28), its shield 32 is grounded, and its other lead 34 provides the vibration signal to preamplifier and filter 16, consisting of two operational amplifiers as shown, AC amplifier 18 has operational amplifier 60 and switch 62, which fixes the amplifier gain 10, 100 or 1000 based on which resistor 64, 66, 68 is switched into the feedback loop of the amplifier circuit. The AC output of amplifier 60 is fed into an RMS-to-DC converter 70 which provides as its output 71 a signal corresponding to the RMS level of the AC signal. Averaging capacitors 126, 128, 129 can be selectively switched into the circuit (by switch 127) to control the constant of integration. Resistor 120 controls the gain of the converter and resistor 122 and potentiometer 124 control the range of the converter. Potentiometer 124 is preadjusted to eliminate noise from the output signal.

Referring to FIG. 3, reference voltage supply 28 has voltage converter 80 which takes +15 volts DC from a power supply (which is not shown and which also supplies voltage to the other elements in FIG. 1) and provides, across capacitor 82, a constant 10 volts DC which is then supplied via preamplifier and filter 16 to transducer 10. Potentiometer 84 is adjustable to preset the voltage at junction 85 precisely at 10 volts. Reference voltage supply 28 also provides a precisely controllable variable output voltage of 0 to 10 volts DC (by means of wire-wound potentiometer 86), which serves as a reference voltage input to comparators and lamp drivers 24. "High" comparator 90 compares the DC voltage from RMS to DC converter 20 with the reference voltage and, when the DC voltage is higher, provides an output signal to the base of transistor 94, switching it on and thereby causing LED lamp 26 to light. Conversely, "low" comparator 92 switches on transistor 96 only when the DC voltage is lower than the reference voltage. Thus one or the other of lamps 26, 27 (but not both) is illuminated at all times.

The specifications of the circuit components are as follows, all of which are connected as shown in FIGS. 1, 2, and 3.

| Figure Reference Numeral | Component | Specification |
| --- | --- | --- |
| 10 | transducer | strain gauge type, requiring +10 volt DC excitation voltage, sensitive over a frequency range of 60 Hz to 15K Hz, and providing an output of 100 mV per g |
| 26 | LED | 559-0102-001 (Red) |
| 27 | LED | 559-2301-001 (Yellow) |
| 50,52 | operational amplifiers | TL082 (National Semiconductor) |
| 60 | FET operational amplifier | AD544 (Analog Devices) |
| 64 | resistor | 10K ohms |
| 66 | resistor | 100K ohms |
| 68 | resistor | 1000K ohms |
| 70 | DC-to-RMS converter | 4341 (Burr Brown) |
| 80 | voltage module | LM117H (National Semiconductor) |
| 82 | electrolytic capacitor | 1 microfarad |
| 84 | potentiometer | 50K ohms |
| 86 | ten turns wirewound potentiometer | 5K ohms |
| 90 | comparator | 460-2 (Datel) |
| 92 | comparator | 460-2 (Datel) |
| 94 | transistor | 2N2222 |
| 96 | transistor | 2N2222 |
| 100 | resistor | 1 megohm |
| 102 | electrolytic capacitor | 0.01 microfarad |
| 104 | electrolytic capacitor | 0.1 microfarad |
| 106 | resistor | 20K ohms |
| 108 | resistor | 20K ohms |
| 110 | resistor | 100K ohms |
| 112 | capacitor | 68 pF |
| 114 | resistor | 100K ohms |
| 116 | resistor | 1K ohms |
| 118 | capacitor | 100 pF |
| 120 | resistor | 10K ohms |
| 122 | resistor | 1 megohm (1%) |
| 124 | potentiometer | 50K ohms |
| 126 | electrolytic capacitor | 25 microfarad |
| 128 | electrolytic capacitor | 50 microfarad |
| 129 | electrolytic capacitor | 75 microfarad |
| 130 | capacitor | 0.1 microfarad |
| 132 | electrolytic capacitor | 10 microfarad |
| 134 | resistor | 240 ohms |
| 136 | diode | 1N4002 |
| 140 | resistor | 1K ohms |
| 142 | resistor | 1K ohms |
| 144 | capacitor | 0.001 microfarad |
| 146 | resistor | 1K ohms |
| 148 | resistor | 1K ohms |
| 150 | diode | 1N914 |
| 152 | resistor | 50 ohms |
| 154 | resistor | 1K ohms |
| 156 | resistor | 1K ohms |
| 158 | resistor | 1K ohms |
| 160 | resistor | 1K ohms |
| 162 | diode | 1N914 |
| 164 | resistor | 50 ohms |

Operation

The DC voltage output of the RMS-to-DC converter represents the average level of the vibrations of the pump to which transducer 10 is mounted. For a smoothly operating pump, the vibration amplitude (and hence the value of the DC voltage) will merely fluctuate above and below a constant average level. The operator adjusts the reference voltage supply 28 until the lamps 26, 27 are alternately illuminated with a frequency equal to the frequency of the fluctuations in the vibration level, which sets the reference voltage at the constant average level of the DC voltage. As long as the vibration amplitude continues to vary back and forth around the constant level, the lamps 26, 27 will continue to light alternately. The operator can selectably read the reference voltage (as an indication of the average vibration level), or the DC voltage (as an indication of the actual vibration fluctuating around the average vibration level).

If the average vibration amplitude then rises (e.g., increases because of a malfunction in a pump bearing), the average vibration level shifts and lamp 26 will be lit constantly (unless the variation in vibration level is so great that at its minimal level it falls below the old average vibration level). This constant illumination of lamp 26 alerts the operator to a possible problem. The converse situation, i.e., a drop in average vibration amplitude will cause lamp 27 to be illuminated, also indicating a potential problem.

The circuit can be readjusted to the new current average vibration level by readjusting potentiometer 86 until lamps 26, 27 again begin to light alternately. Thus potentiometer 86 serves as a controllable storage element for holding a reference value corresponding to a selected vibration level.

The lamps give a quickly responsive and highly sensitive indication (without the time lag inherent in meters and in digital displays requiring A to D conversion) of whether the average vibration level of the pump is remaining the same or, if changing, the direction of the change. The reference level is easily adjusted to the current average vibration level and when they are the same the frequency of the alternation of the lamps gives an indication of how closely the average level is following the reference.

Other embodiments are within the following claims. E.g., the pump can be any vibrating objects, and the lamps can be other types of high and low indicators.

We claim:

1. An apparatus for indicating changes in the average level of vibrations in a vibrating object compared with a selected constant level of vibrations, said vibrating object being characterized in that said average level normally alternates above and below said constant level, spending equal amounts of time on either side of said selected constant level, said apparatus having a transducer for sensing said vibrations and means responsive to said transducer for determining said average level, the improvement wherein said means comprises a storage element for holding a reference value corresponding to said selected level of said vibrations, and compare and indicator means responsive to said storage element and said transducer for indicating the relationship between said average level and said reference value, said compare and indicator means having an indicator which alternates equally between two discrete perceptible states when said average level is alternating equally above and below said reference value, and any changes in said relationship are represented by changes in the relative proportion of time during which said indicator occupies each of said two states.

2. The improvement of claim 1 wherein said storage element is controllable for updating said reference value to correspond to the current said average level.

3. The improvement of claim 1 wherein said compare and indicator means comprises a comparator for providing a signal when said average level is greater than said selected constant level, and said indicator is responsive to said comparator and arranged to be activated when said signal is provided.

4. The improvement of claim 3 further comprising an additional comparator for providing a further signal when said average level is less than said selected constant level, and an additional visual indicator responsive to said additional comparator and arranged to be activated when said further signal is provided, whereby when fluctuations of said average level are centered on said selected constant level, said visual indicators are activated alternately at the frequency of said fluctuations.

5. The improvement of claim 1 wherein said compare and indicator means comprises a comparator for providing a signal when said average level is less than said selected constant level, and said indicator is responsive to said comparator and arranged to be activated when said signal is provided.

6. The improvement of claim 3, 4 or 5 wherein said storage element is a controllable voltage source, said reference value is a first voltage, said means for determining provides a second voltage corresponding to said average level, and said comparator compares said voltages.

7. The improvement of claim 1 wherein said compare and indicator means comprises a readout element for displaying said average level and said selected constant level.

* * * * *